(12) United States Patent
Simpson et al.

(10) Patent No.: US 7,493,874 B2
(45) Date of Patent: Feb. 24, 2009

(54) TELESCOPING PET RAMP

(75) Inventors: Jeffrey M. Simpson, 381 Oak Ridge Dr., Auburn, AL (US) 36830; Mark A. Haley, Asheville, NC (US)

(73) Assignee: Jeffrey M. Simpson, Auburn, AL (US)

( * ) Notice: Subject to any disclaimer, the term of this patent is extended or adjusted under 35 U.S.C. 154(b) by 0 days.

(21) Appl. No.: 11/936,392

(22) Filed: Nov. 7, 2007

(65) Prior Publication Data
US 2008/0105215 A1    May 8, 2008

Related U.S. Application Data

(60) Provisional application No. 60/864,624, filed on Nov. 7, 2006.

(51) Int. Cl.
*A01K 29/00* (2006.01)
(52) U.S. Cl. .................................................. 119/849
(58) Field of Classification Search ......... 119/847–849, 119/843, 445, 503, 516, 525, 528–530; 52/182, 52/183; 296/53, 57.1, 55, 61, 50, 51; 14/69.5, 14/70, 71.1, 71.5, 71.3, 71.7, 72.5; 414/480, 414/537, 921; D34/32
See application file for complete search history.

(56) References Cited

U.S. PATENT DOCUMENTS 3,763,827 A * 10/1973 Burkart ...................... 119/849
5,803,523 A * 9/1998 Clark et al. ................. 296/26.1
5,813,365 A * 9/1998 Helmy ........................ 119/528
6,119,634 A * 9/2000 Myrick ........................ 119/847
6,267,082 B1 * 7/2001 Naragon et al. ............. 119/849
6,345,950 B1 * 2/2002 Gerwitz ...................... 414/537
6,389,629 B1 * 5/2002 Schouest ..................... 14/69.5
6,447,150 B1   9/2002 Jen et al.
6,715,177 B1 * 4/2004 Lagergren-Julander ..... 14/69.5
6,725,487 B2 * 4/2004 Myrick et al. ................ 14/69.5
7,179,042 B1 * 2/2007 Hartmann et al. ........... 414/537

OTHER PUBLICATIONS

"Solvit Products Telescoping Pet Ramp II"; www.solvitproducts.com; 1 pg (date unknown).
"Triple Telescoping 72" Ramp; www.dogramp.com; 2003-2007; 1 pg (date unknown).

* cited by examiner

*Primary Examiner*—Thomas Price
(74) *Attorney, Agent, or Firm*—Gardner Groff Greenwald & Villanueva, PC

(57) ABSTRACT

A telescoping pet ramp having first and second ramp segments telescopically extendable from a compact state to an extended state. Side rails of the panels include end caps with abutment members for preventing the first floor panel and second floor panel from being separated when the pet ramp is fully extended, and including interlocking angled contact faces that frictionally engage one another when the ramp is fully extended.

21 Claims, 6 Drawing Sheets

TELESCOPING PET RAMP

CROSS-REFERENCE TO RELATED APPLICATION

This application claims priority to U.S. Provisional Patent Application Ser. No. 60/864,624, filed Nov. 7, 2006, which is incorporated herein by reference in its entirety for all purposes.

TECHNICAL FIELD

The present invention relates generally to a pet ramp, and more particularly to a telescoping pet ramp for enabling a pet to climb up and down from an elevated structure, for example in getting into and out of a vehicle.

BACKGROUND OF THE INVENTION

A growing number of households both in the United States and abroad have pets. Often the pets will need to climb up or down from an elevated structure, such as onto a piece of furniture, into an elevated pen, or into a vehicle for travel. It can be difficult for many persons to lift their pets into their vehicle or onto other elevated structures. This is especially true with aging owners, aging or larger pets, and when traveling in taller vehicles. In addition, some pets are overweight, which makes it more difficult for the pet to climb, and more difficult for the owner to lift the pet. Therefore, many pet owners utilize a step or ramp to assist their pets in climbing into a vehicle or other elevated structure.

Two types of pet ramps are presently known: folding ramps and telescoping ramps. Folding ramps are often more difficult to erect than telescoping ramps, as a user must remove them from a vehicle before positioning the ramp against the vehicle door's threshold. Also, adjustment of the ramp's span is limited. Telescoping ramps can simply be extended by a user and placed against the threshold. A problem with many known ramps is that they often have sharp edges and corners, which can injure the pet or the owner during operation, and can scratch a vehicle or furniture. Also, known ramps are often not long enough to allow for an acceptable slope to allow the pet to easily enter or exit a vehicle. Finally, known ramps are often not strong or rigid enough for many types of pets, such as larger dogs. Even a moderate amount of flexure or "bounce" in the ramp may frighten a pet, leading the pet to resist using the ramp.

Thus it can be seen that needs exist for improvements to pet ramps that are easy to use, safe, and allow pets to easily climb up and down, into and out of a vehicle or other elevated structure. It is to the provision an improved pet ramp meeting these and other needs that the present invention is primarily directed.

SUMMARY OF THE INVENTION

In example forms, the present invention is a telescoping pet ramp including a first floor panel and a second floor panel, wherein the first floor panel is telescopically coupled to the second floor panel so that the ramp is extendable for use and collapsible for transport and storage. Each floor panel includes abutment members having stops for preventing the first floor panel and second floor panel from being separated when the pet ramp is fully extended, the stops preferably having interlocking tongues that frictionally wedge together when the ramp is fully extended, thereby providing a secure joint with improved rigidity and decreased bounce.

In one aspect, the present invention is a pet ramp having a first segment and a second segment, wherein the first and second segments each have a floor panel with side rails extending along lateral sides thereof. Additionally, the side rails have abutment members mounted thereto. The second segment of the ramp is telescopically slidable relative to the first segment between a compact position and an extended position. The abutment members of the first segment comprise a first obliquely angled surface, and the abutment members of the second segment comprise a second obliquely angled surface. The first and second obliquely angled surfaces engage one another to rigidly couple the first and second segments in the ramp's extended position. Optionally, the obliquely angled surfaces of the abutment members comprise a compound angle to more securely lock the first and second segments when the ramp is extended.

In another aspect, the invention is a ramp including a first ramp segment having a first floor panel and a first rail extending along a lateral side of the first floor panel, the first rail having a first abutment member at a proximal end thereof. The ramp also includes a second ramp segment having a second floor panel and a second rail extending along a lateral side of the second floor panel, the second rail having a second abutment member at a proximal end thereof. The second ramp segment is telescopically slidable relative to the first ramp segment between a compact position and an extended position, wherein the first and second abutment members releasably engage one another in the extended position.

In another aspect, the present invention is a pet ramp having a first segment and a second segment, wherein the first and second segments each a have floor panel with side rails extending along lateral sides thereof. The side rails have end caps mounted thereto. The second segment is telescopically slidable relative to the first segment between a compact position and an extended position. The floor panels of the first and second segments comprise blow-molded plastic and the side rails of the first and second segments comprise glass fiber-reinforced plastic.

In still another aspect, the invention is a pet ramp including a first member having a first floor panel with first side rails extending along lateral sides thereof. The pet ramp further includes a second member having a second floor panel with second side rails extending along lateral sides thereof. The second member is telescopically extendable relative to the first member. The first and second floor panels are formed of blow-molded plastic and the first and second side rails are formed of glass fiber reinforced plastic.

In still another aspect, the present invention comprises a first segment and second segment, wherein the first and second segments each a have floor panel with side rails extending along lateral sides thereof. The side rails have abutment members at distal ends thereof. The second segment is telescopically slidable relative to the first segment between a compact retracted position and a longer extended position. Additionally, the abutment members of the first segment include a first obliquely angled surface and the abutment members of the second segment include a second obliquely angle surface. The first and second angled surfaces engage one another in the ramp's extended position. Furthermore, the first and second obliquely angled surfaces comprise a first angle of inclination in a first dimension and a second angle of inclination in a second dimension, thus forming a compound angled coupling between the first and second segments of the ramp.

In another aspect, the invention is a pet ramp including a first ramp segment having a first abutment member with an obliquely angled first contact face, and a second ramp segment having a second abutment member with an obliquely angled second contact face. The second ramp segment is translationally extensible relative to the first ramp segment to bring the first contact face into engagement with the second contact face.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
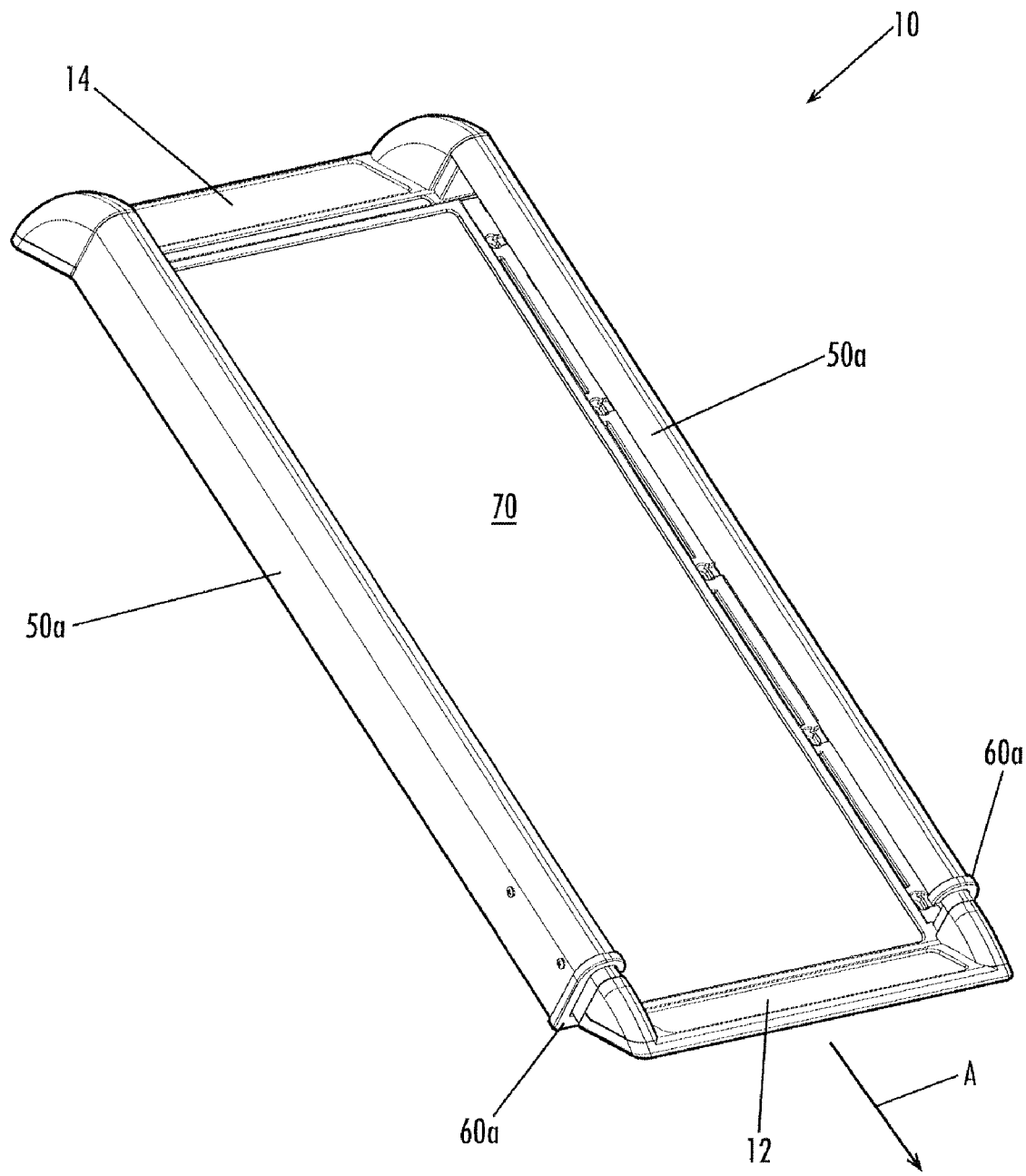
FIG. 1 is a perspective view of a telescoping pet ramp according to an example embodiment of the present invention, shown in a compact or retracted configuration.
Figure 2:
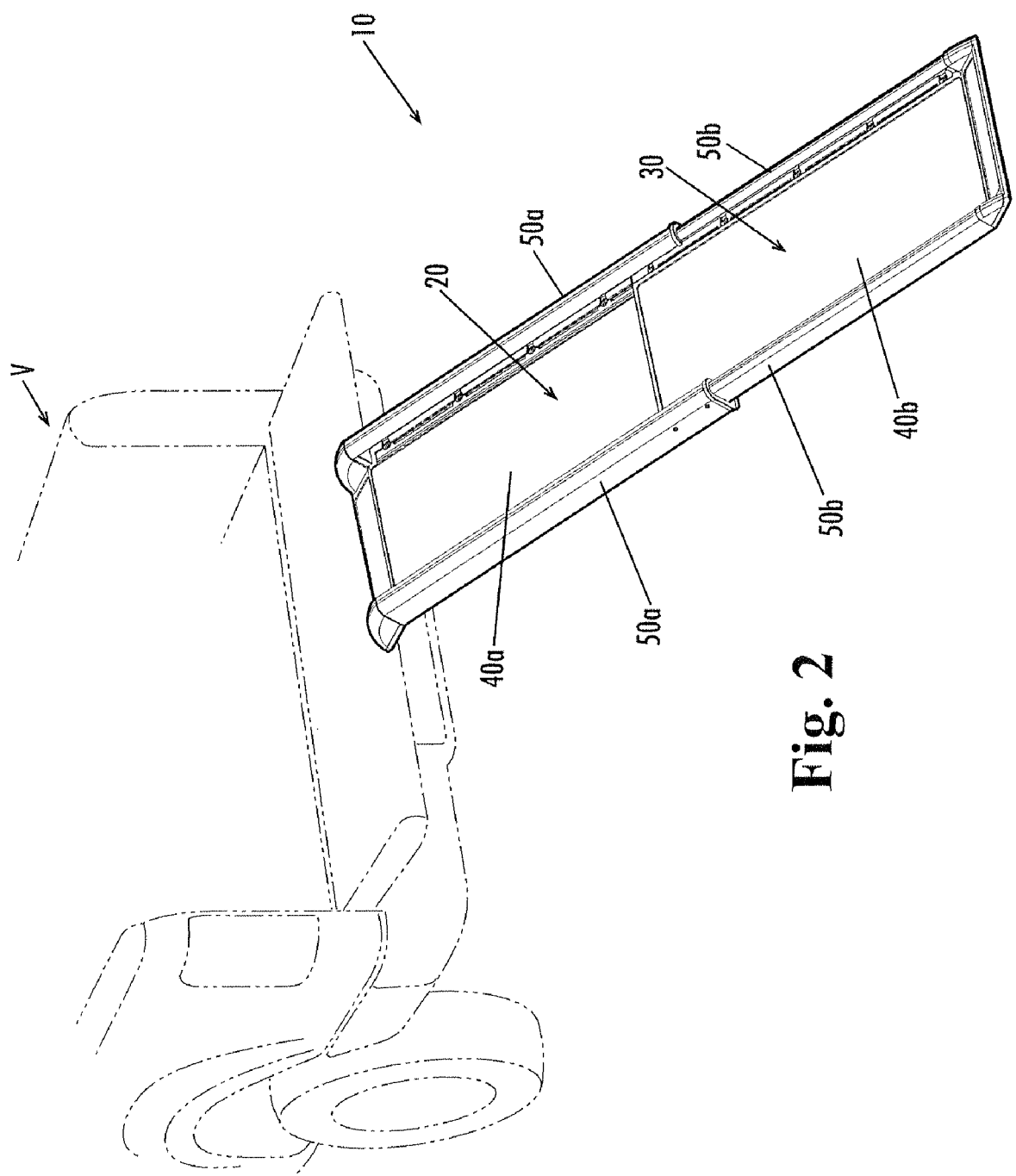
FIG. 2 shows the telescoping pet ramp of FIG. 1 in use with a vehicle, and shown in an extended configuration.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, FIGS. 1-4 show a telescoping pet ramp 10 according to an example embodiment of the present invention. Generally, the pet ramp 10 includes a first (or upper) segment 20 and second (or lower) segment 30, wherein the second segment is telescopically or nestingly coupled to the first. Optionally, a third (and possibly more) segment(s) is/are telescopically received by the first, second or other segments in sequence to provide additional length. The lower segment 30 of the ramp 10 preferably terminates at its outer or distal end in a lower base member or foot 12 for supporting the ramp upon the ground or other lower support surface, and the upper segment 20 preferably terminates at its outer or distal end in an upper support member or stabilizer 14 for supporting the ramp on an elevated upper support surface. The lower base member or foot 12 and the upper support member or stabilizer 14 can be integrally formed with the ramp segments 30, 20, or can be separate components attached to the respective ramp segments by screws, adhesive, welding or other attachment means. The pet ramp 10 of the present invention can be used to allow pets to climb up or down to enter or exit a car, truck, boat, or other vehicle V. The ramp 10 can also be used in other situations in which a pet needs to climb up or down, such as a bed, veterinary examination table, raised kennel, or other upper support surface. In example forms, the telescoping pet ramp 10 is about 70 inches fully extended and about 42 inches fully compacted. Other lengths can be produced to meet the specific needs and desires of a particular user or application and can range from 60 inches or less, to more than 100 inches fully extended.

The telescoping segments 20, 30 each comprise a floor panel 40a, 40b, side rails 50a, 50b extending along both sides of the floor panels, end caps 60a, 60b comprising interengaging abutment members, and frictional tread surfaces 70. In example embodiments, the floor panels 40 are manufactured from blow-molded plastic, which provides considerable lateral stiffness and rigidity. A further benefit of blow-molded floor panels 40 over injection-molded panels is that the panels are able to maintain soft corners and do not have exposed ribs. By having soft corners and no exposed ribs, the pet ramp 10 is safer for both the pet and the owner and is less likely to scratch the paint or finish of a vehicle. In alternate embodiments, the panels 40 are fabricated from other materials, such as metal, rubber or other types of plastic. In order to ensure that a pet climbing up or down the ramp 10 does not slip, the upper faces of the floor panels 40 preferably have a tread surface 70 comprising grip tape or other frictional surface treatment, corrugations, waves, stippling, ridges, treads, and/or ribbing thereon, to provide a gripping surface for the pet's feet.

The side rails 50 are preferably formed of pultruded glass fiber reinforced plastic (GFRP). The GFRP side rails provide for a greater longitudinal stiffness-to-weight ratio than materials used in the construction of known pet ramps. The rails 50 provide a "curb" extending a distance above the walking surface 70 of the floor panels 40a, 40b, to help keep a pet from falling off the ramp 10 when climbing up or down, and also provide space for the ramp's telescoping and bracing support assemblies, which will be further explained below. In alternate embodiments, the rails 50 are formed from metal, rubber, injection-molded or blow-molded plastic, or other materials of construction. In still other alternative embodiments all or a portion of each segment of the ramp, including the panels, rails, and/or end caps, is integrally formed of the same material, as a unitary component.

Figure 3:
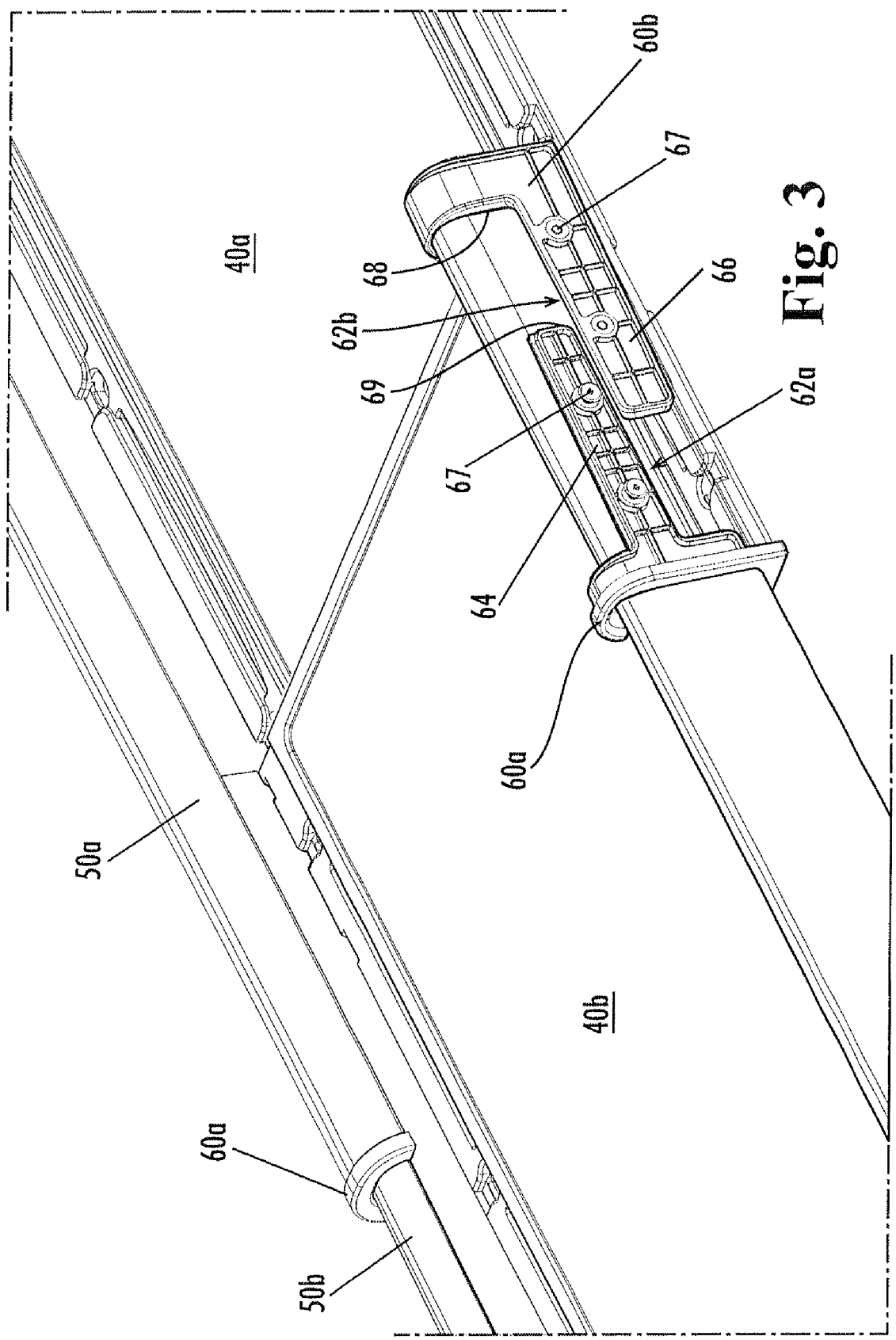
FIG. 3 is a detailed perspective view of abutment member portions of the telescoping pet ramp of FIG. 1, partially disengaged and shown in cutaway view with a rail portion removed for clarity.
Figure 4:
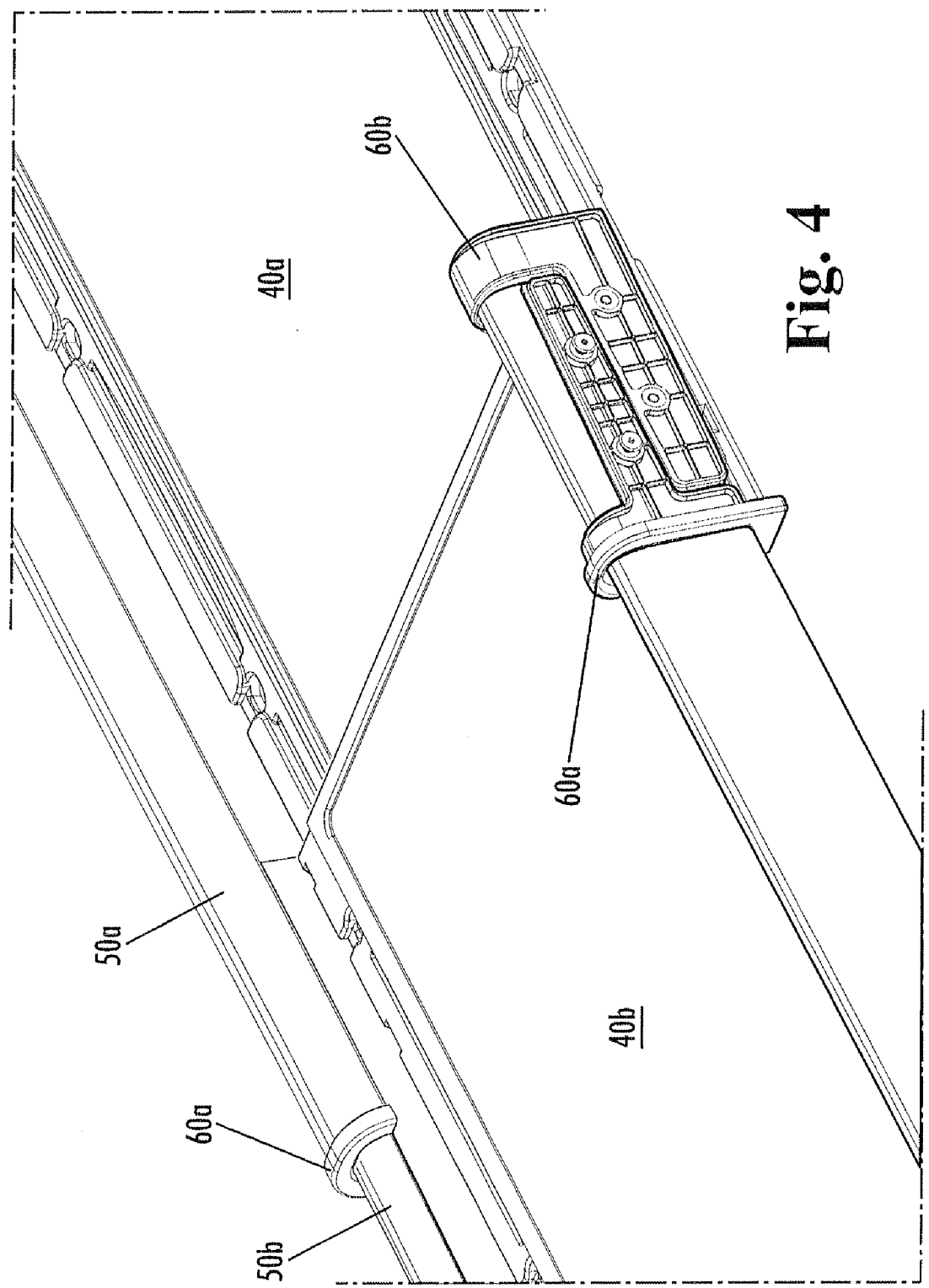
FIG. 4 is a detailed perspective view of abutment member portions of the telescoping pet ramp of FIG. 1, in an engaged position and shown in cutaway view with a rail portion removed for clarity.
Figure 5:
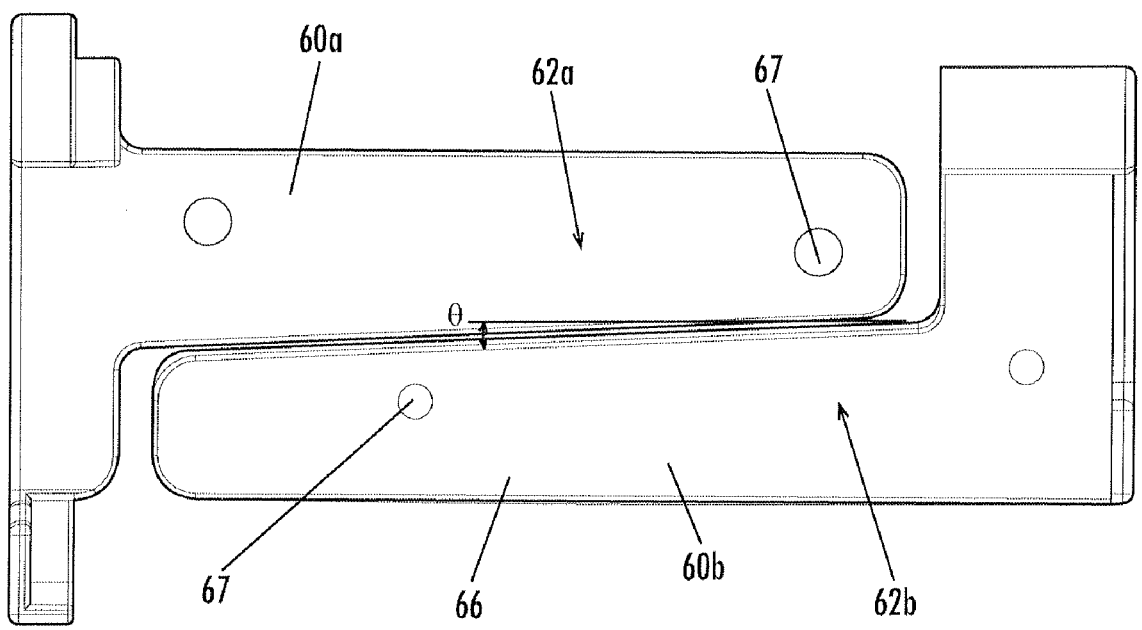
FIG. 5 is a detailed side view showing abutment member components of the pet ramp of FIG. 1.
Figure 6:
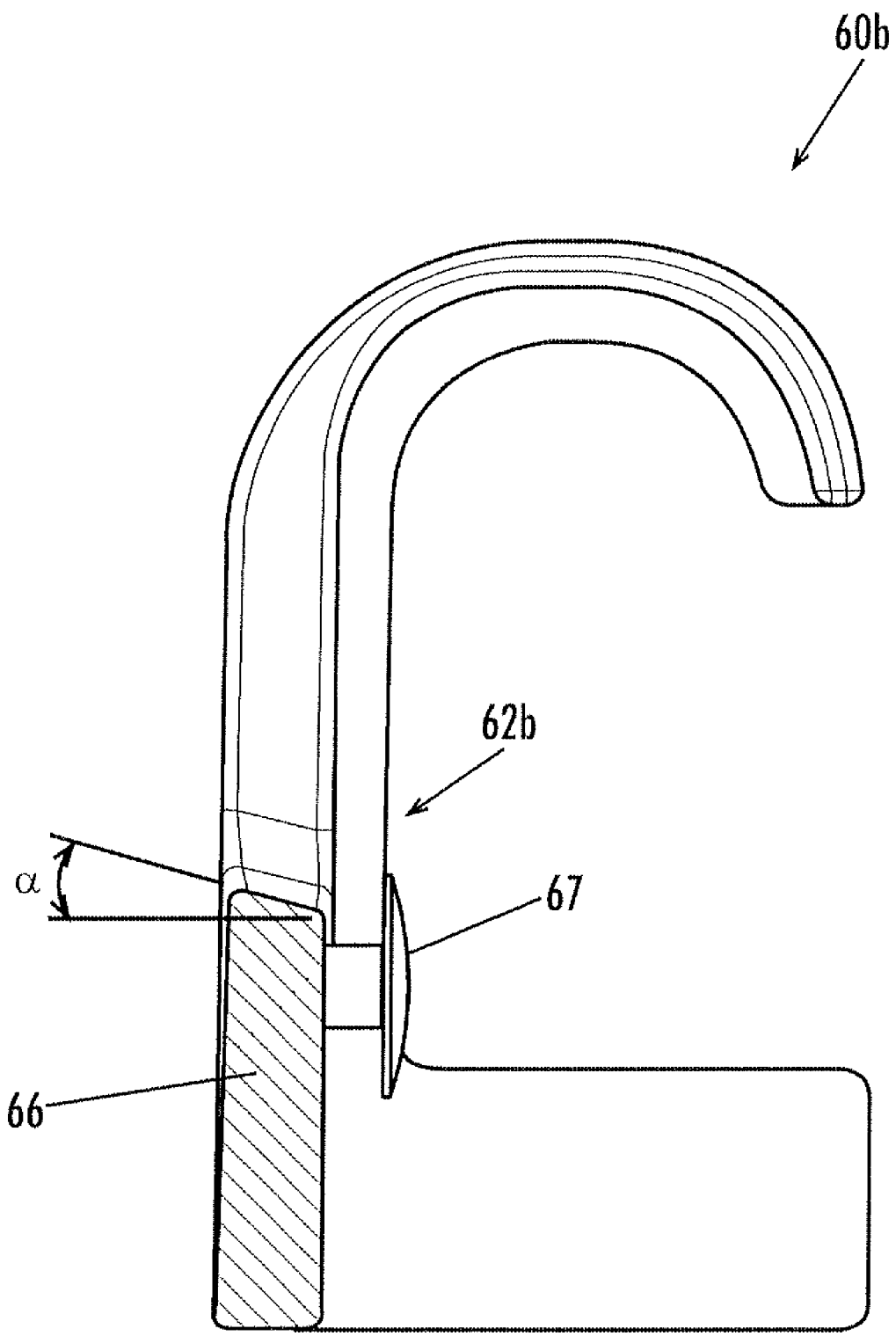
FIG. 6 is a detailed end view, in cross-section, showing an abutment member component of the pet ramp of FIG. 1.

In order to provide a telescoping function to the pet ramp 10, the rails 50a of the first ramp segment 20 are at least partially hollow and include elongate lengthwise channels configured to slidably receive therein the rails 50b of the second segment 30 as the ramp is extended and retracted. The outer profiles of the lower rails 50b are preferably configured to closely match the inner profile of the upper rails 50a (or vice versa) to provide a close running fit therebetween as the ramp is telescopingly extended and retracted, with sufficient frictional contact to prevent unwanted movement between the two segments 20, 30. In cross-section, the profile of the upper rails 50a can be configured generally as an open C-shaped or J-shaped channel, whereby the openings of the channels of each rail face inwards, toward the floor panel 40a. The lower rails 50b preferably comprise generally complementary inwardly facing C-shaped or J-shaped flanges with outer profiles that closely correspond to the interior contour of the upper rails 50a and closely fit between the sidewalls thereof. The lower rails 50b are preferably also configured to slide over the upper panel 40a. In example embodiments, as depicted in FIG. 4b, the floor panel 40b of the second ramp segment 30 slides above the floor panel 40a of the first ramp segment 20 so that the pet ramp 10 can be maneuvered into a compact position (FIG. 3). Returns or guide channels in the upper rails 50a provide a groove or bearing surface for the lower panel 40b to slide along when moving the first and second telescoping segments 20, 30 over each other. In alternate embodiments, the rails of the first segment are telescopingly received in channels formed in the rails of the second segment; and/or the second segment 30 slides above or beneath the first segment 20.

End caps 60a, 60b comprising internal abutment members 62 are affixed at the inner or proximal ends of the rails 50a, 50b of the first and second ramp segments 20, 30, respectively. FIGS. 3-6 show detailed views of the endcaps 60 and abutment members, and their manner of operation. The end caps 60 are preferably manufactured from injection-molded plastic such as glass-filled nylon. Each upper end cap 60a comprises an upper abutment member 62a, which cooperatively engages a corresponding lower abutment member 62b of the counterpart lower end cap 60b when the ramp is fully extended, forming a sliding abutment coupling to prevent the second ramp segment 30 from separating from the first ramp segment 20 when in use. In example embodiments, the end caps 60a, 60b have mounting flange portions that are generally C-shaped or J-shaped in profile (see FIG. 6) to engage the corresponding profiles of the rails, and the abutment members 62a, 62b comprise interlocking tongues 64, 66 extending from the mounting flange portions and having obliquely angled contact faces, which wedge together when the ramp is extended (see FIG. 4) to better lock the ramp segments 20, 30 together. The abutment members 62a, 62b can further comprise at least two opposed stop faces 68, 69, which extend generally perpendicular to the axis of sliding movement between the ramp segments. The stop faces 68, 69 prevent further sliding movement between the first and second ramp segments 20, 30 upon engagement, to limit the extension of the ramp at the extended position and prevent detachment of the first and second ramp segments. In example embodiments, tongue 64 is permanently based within the upper end cap 60a, while tongue 66 is fixed to the end cap 60b of the second member 30 and moves into engagement with the tongue 64 when the ramp 10 is fully extended. Placement of the interengaging stop surfaces of the abutment members 62 internally within the rails 50a of the ramp, between the outer rails 50a and the inner rails 50b, minimizes the risk of pinching during use. The abutment members 62a, 62b form a sliding coupling or joint between the ramp segments, and optionally include contact faces defining compound angles relative to the axis A of extension and retraction of the telescopically sliding ramp segments. For example, when viewed from the side (FIG. 5), the tongues 64, 66 have oblique contact faces oriented at approximately a 2° draft angle θ, in a first plane or dimension (e.g., the "X-dimension" in a Cartesian coordinate system), to provide interlocking engagement therebetween. When viewed end-on (FIG. 6), it can be seen that the tongues 64, 66 are also obliquely angled at approximately a 15° draft angle α in a second plane or dimension orthogonal to the first (e.g., the "Y-dimension") to help prevent the tongues from twisting or flexing apart. In other embodiments, the draft angles θ, α may differ depending on the application. Aesthetically, the end caps 60 also provide a "finished" look at the ends of the rails 50.

In this manner, the ramp's telescoping and bracing support assemblies provide considerable structural stiffness and strength in use. Overlap between the rails 50a, 50b carries a great deal of the animal's weight when the ramp 10 is not fully extended, while the end caps 60 bear the majority of the pet's weight when the ramp is fully extended (when bending moment is greatest, and overlap between the ramp segments is least). Engagement of the angled tongues 64, 66 that wedge together when the ramp is fully extended, provides a secure and rigid joint to retain the ramp in its extended position and minimize flex and bounce, so that the pet is less likely to be frightened during use. The interengaging wedge-shaped design and/or compound angles of the tongues better distributes the pet's load across a considerable surface area rather than permitting point loading to occur, for example, if a single bolt was used instead of the wedged tongues. This design also helps transfer the pet's load from the telescoping ramp segments 20, 30 into bolts 67 or other fasteners that connect the end caps to the side rails of the ramp segments. In order to further strengthen the end caps 60, one or more structural reinforcement flanges, braces or adders can also be included within the end caps. And as previously mentioned, to prevent ramp segments 20, 30 from flexing or twisting apart, an approximately 15° draft angle α is preferably provided on the mating surfaces of the tongues of the end caps.

In example embodiments, when the pet ramp 10 of the present invention is not in use, it can be telescopically compressed or collapsed into a compact position (FIG. 1) for storage. When a user wishes to utilize the ramp 10, the user extends the second ramp segment 30 outwardly from the first ramp segment 20 to the desired length by telescopingly sliding the second segment laterally relative to the first segment. In order to minimize frictional wear between the rails 50 and end caps 60 when the pieces are slidingly extended, bearings (not shown) and/or a low-friction glide surface can optionally be integrated within the end caps for smooth travel. As the user extends the two ramp segments into their extended positions (FIGS. 2 and 4), the interlocking tongues 64, 66 are engaged and frictionally lock together to prevent the ramp 10 from being further separated. The user can then place angled lower ramp feet 12 against the ground and the flat upper ramp stabilizers 14 against the upper support surface that the pet is intended to climb to or from. Once the pet has climbed the ramp 10, the user can simply slidingly retract the ramp segments and return the pet ramp to its storage position. It can be seen that the pet ramp 10 of the present invention is easy to erect and is safe for both the pet and the owner to use.

While the invention has been described with reference to preferred and example embodiments, it will be understood by those skilled in the art that a variety of modifications, additions and deletions are within the scope of the invention, as defined by the following claims.

What is claimed is:

1. An extensible ramp comprising:
   a first ramp segment comprising a first floor panel and a first rail extending along a lateral side of the first floor panel, the first rail having a first abutment member substantially contained therein and affixed at a proximal end thereof; and
   a second ramp segment comprising a second floor panel and a second rail extending along a lateral side of the second floor panel, the second rail having a second abutment member affixed at a proximal end thereof, the second abutment member being substantially contained within the first rail, and the second ramp segment being telescopically slidable relative to the first ramp segment between a compact position and an extended position;

wherein the first and second abutment members releasably engage one another in the extended position.

2. The extensible ramp of claim 1, wherein the first and second abutment members comprise obliquely angled contact faces.

3. The extensible ramp of claim 2, wherein the obliquely angled contact faces define compound angles.

4. The extensible ramp of claim 1, wherein the first and second abutment members comprise contact surfaces defining a first angle of inclination in a first dimension and a second angle of inclination in a second dimension.

5. The extensible ramp of claim 1, wherein the first and second floor panels comprise blow-molded plastic.

6. The extensible ramp of claim 1, wherein the first and second rails comprise glass fiber reinforced plastic.

7. The extensible ramp of claim 1, wherein the first and second floor panels comprise a frictional tread surface for permitting a pet to climb thereon.

8. The extensible ramp of claim 1, wherein the second rail is slidingly received within an elongate channel in the first rail.

9. A pet ramp comprising:
a first member comprising a first floor panel with first side rails extending along lateral sides thereof;
a second member comprising a second floor panel with second side rails extending along lateral sides thereof, the second member being telescopically extendable relative to the first member;
wherein the first and second floor panels comprise blow-molded plastic and wherein the first and second side rails comprise glass fiber reinforced plastic; and
wherein the side rails of the first panel comprise first endcaps having a first obliquely angled surface, and wherein the side rails of the second panel comprise second endcaps having a second obliquely angled surface, and wherein the first and second obliquely angled surfaces engage one another in the extended position.

10. The pet ramp of claim 9, wherein the floor panels of the first and second members comprise a frictional contact surface.

11. The pet ramp of claim 9, wherein the first and second obliquely angled surfaces each comprise a first angle of inclination in a first plane, and a second angle of inclination in a second plane orthogonal to the first plane.

12. A pet ramp comprising:
a first ramp segment comprising a first endcap and a first abutment member having an obliquely angled first contact face, the first abutment member being substantially contained within the first endcap; and
a second ramp segment comprising a second endcap and a second abutment member having an obliquely angled second contact face, the second abutment member being substantially contained within the second endcap,
wherein the second ramp segment is translationally extensible relative to the first ramp segment to bring the first contact face into engagement with the second contact face.

13. The pet ramp of claim 12, wherein the first and second contact faces define compound angles.

14. The pet ramp of claim 12, wherein the first and second contact faces define a first angle of inclination in a first dimension, and a second angle of inclination in a second dimension orthogonal to the first dimension.

15. The pet ramp of claim 12, wherein the first and second ramp segments comprise floor panels formed of blow-molded plastic.

16. The pet ramp of claim 15, wherein the floor panels comprise a frictional contact surface.

17. The pet ramp of claim 12, wherein the first and second ramp segments comprise side rails formed of glass fiber reinforced plastic.

18. The pet ramp of claim 12, wherein the first ramp segment comprises a first side rail, and wherein the second ramp segment comprises a second side rail slidable within the first side rail.

19. The pet ramp of claim 18, wherein the first and second abutment members are positioned internally within the first side rail.

20. The pet ramp of claim 18, wherein the first and second abutment members are positioned between the first side rail and the second side rail.

21. The pet ramp of claim 18, wherein the endcaps comprise mounting flange portions having tongues comprising the first and second abutment members extending therefrom.

* * * * *